(12) United States Patent
Kim et al.

(10) Patent No.: US 8,185,167 B2
(45) Date of Patent: May 22, 2012

(54) BOSS REINFORCING APPARATUS IN PORTABLE COMMUNICATION DEVICE

(75) Inventors: Jin-Yong Kim, Ansan-si (KR); Sang-Gook Kim, Suwon-si (KR); Seong-Ki Jeong, Siheung-si (KR)

(73) Assignee: Samsung Electronics Co., Ltd (KR)

( * ) Notice: Subject to any disclaimer, the term of this patent is extended or adjusted under 35 U.S.C. 154(b) by 246 days.

(21) Appl. No.: 12/510,749

(22) Filed: Jul. 28, 2009

(65) Prior Publication Data

US 2010/0048147 A1  Feb. 25, 2010

(30) Foreign Application Priority Data

Aug. 21, 2008  (KR) .................... 10-2008-0081821

(51) Int. Cl.
*H04M 1/00*  (2006.01)
(52) U.S. Cl. .................................. 455/575.1; 455/90.3
(58) Field of Classification Search ............. 455/90.3, 455/575.1
See application file for complete search history.

(56) References Cited

U.S. PATENT DOCUMENTS

| | | | |
|---|---|---|---|
| 6,669,042 B1 * | 12/2003 | Wortman | 220/3.8 |
| 2002/0128744 A1 * | 9/2002 | Nishiyama et al. | 700/200 |
| 2006/0216469 A1 * | 9/2006 | Hashizume et al. | 428/119 |
| 2008/0146293 A1 | 6/2008 | Kim | |

FOREIGN PATENT DOCUMENTS

| | | |
|---|---|---|
| KR | 100810266 | 2/2008 |
| KR | 100834641 | 5/2008 |

* cited by examiner

*Primary Examiner* — Barry Taylor
(74) *Attorney, Agent, or Firm* — The Farrell Law Firm, P.C.

(57) ABSTRACT

Disclosed is a boss reinforcing apparatus of a portable communication device including a press member, the boss reinforcing apparatus including at least one reinforcing part assembled with a boss that is formed on a case of the portable communication device when the case is insert-injection-molded onto the press member, to reinforce the boss and prevent a screw assembling part formed on the boss from separating from the boss.

3 Claims, 4 Drawing Sheets and prevent the screw assembling part 2a from separating from the boss 2 when the product is dropped or externally impacted.

BOSS REINFORCING APPARATUS IN PORTABLE COMMUNICATION DEVICE

PRIORITY

This application claims priority under 35 U.S.C. §119(a) to a Korean Patent Application entitled "Boss Reinforcing Apparatus in a Portable Communication Device" filed in the Korean Industrial Property Office on Aug. 21, 2008 and assigned Serial No. 10-2008-0081821, the contents of which are incorporated herein by reference.

BACKGROUND OF THE INVENTION

1. Field of the Invention

The present invention relates generally to a boss reinforcing apparatus, and more particularly, to a boss reinforcing apparatus of a portable communication device including at least one reinforcing part assembled with a boss that is formed on a case of the communication device when the case is insert-injection-molded onto a press member of the portable communication device.

2. Description of the Related Art

A portable communication device generally provides wireless communication between users. The portable communication device includes such devices as Hand-Held Products (HHPs), cellular phones, digital phones, Personal Communication Services (PCSs) and Personal Digital Assistants (PDAs). Wireless terminals are classified into bar, flip, and folder-type terminals according to their appearance.

The bar-type terminals include a single bar-type housing, the flip-type terminals have a bar-type housing with which a flip or a cover is rotatably assembled by a hinge device, and the folder-type terminals have a bar-type housing with which a folder is rotatably assembled by a hinge device, to be folded. Conventional portable communication devices include an antenna device, a data input/output device, and a data transmitting/receiving device. A key button, touch pad or touch screen is generally used for the data input device to allow the user to input data through a finger press.

For instance, the bar-type portable communication device includes a single housing having a front case and a rear case, wherein the front case is insert-injection-molded on a press member. The front case includes a plurality of bosses for screw assembling with the rear case.

The boss includes a screw assembly unit having a screw hole that is assembled with the screw. However, the conventional bosses tend to be deformed or even broken in assembling the front case and the rear case with the screw.

To solve these problems, as shown in FIGS. 1 and 2, the boss reinforcing apparatus of the portable communication device 1 includes a plurality of reinforcing ribs 4 in the external side of the boss 2, or the boss 2 is reinforced on a press member 3 through additional processing, such as riveting or welding. However, the rib for reinforcing the boss is limited in reinforcing the injection molded product due to the slimness of the portable communication device. Further, separate riveting or welding processing increases the price and decreases the productivity of the product.

SUMMARY OF THE INVENTION

Accordingly, the present invention has been made to solve the above-stated problems occurring in the prior art, and an object of the present invention is to provide a boss reinforcing apparatus of a portable communication device, the reinforcing apparatus including at least one reinforcing part formed on a press member, the reinforcing part being assembled with a boss that is formed on a case of the portable communication device to reinforce the boss and prevent a screw assembling part formed on the boss from separating from the boss when the case is insert-injection-molded onto the press member, and to improve the boss reinforcing force of a product and prevent the screw assembling part of the boss from separating when the product is dropped or externally impacted.

An object of the present invention is to provide a boss reinforcing apparatus of a portable communication device, in which at least one reinforcing part is integrally formed with a press member of the portable communication device to obviate the use of a conventional reinforcing rib member and additional processing such as a welding, to reduce the cost and productivity of the product.

In accordance with the present invention, there is provided a boss reinforcing apparatus of a portable communication device including a press member, the reinforcing apparatus having at least one reinforcing part assembled with a boss that is formed on a case of the portable communication device when the case is insert-injection-molded onto the press member, to reinforce the boss and prevent a screw assembling part formed on the boss from separating from the boss.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. Those of ordinary skill in the art will recognize that various modifications of the embodiments described herein can be made without departing from the scope and spirit of the invention. Descriptions of well-known functions and constructions are omitted for the sake of clarity and conciseness.

Figure 1:
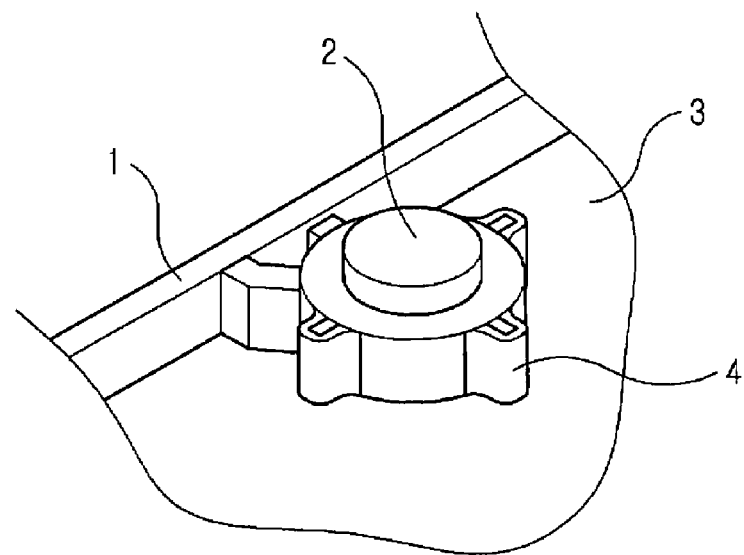
FIG. 1 illustrates a first embodiment of a conventional boss reinforcing apparatus of a portable communication device.
Figure 2:
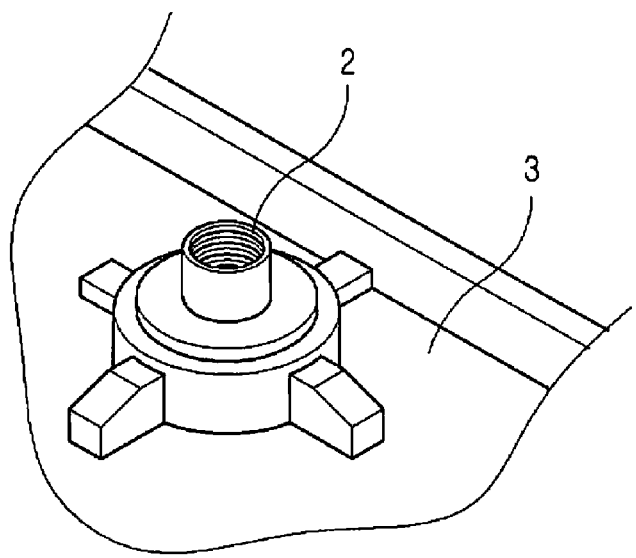
FIG. 2 illustrates a second embodiment of a conventional boss reinforcing apparatus of a portable communication device.
Figure 3:
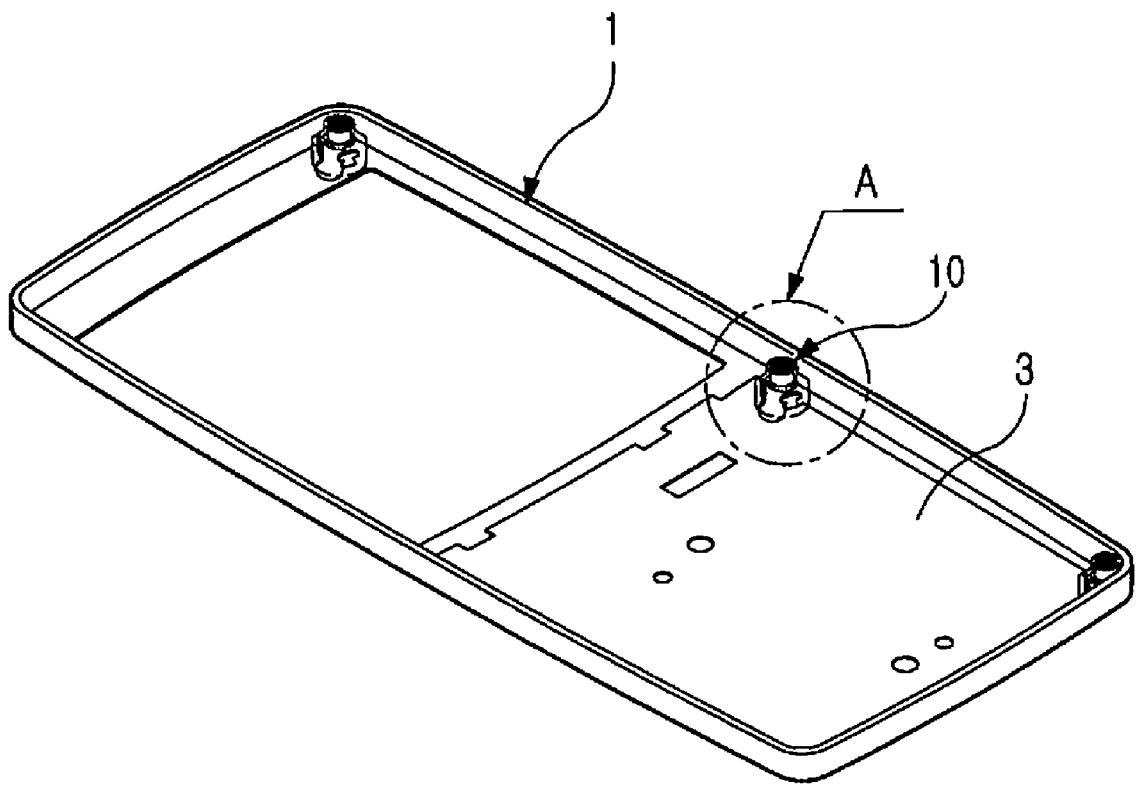
FIG. 3 illustrates a boss reinforcing apparatus of a portable communication device according to the present invention.
Figure 4:
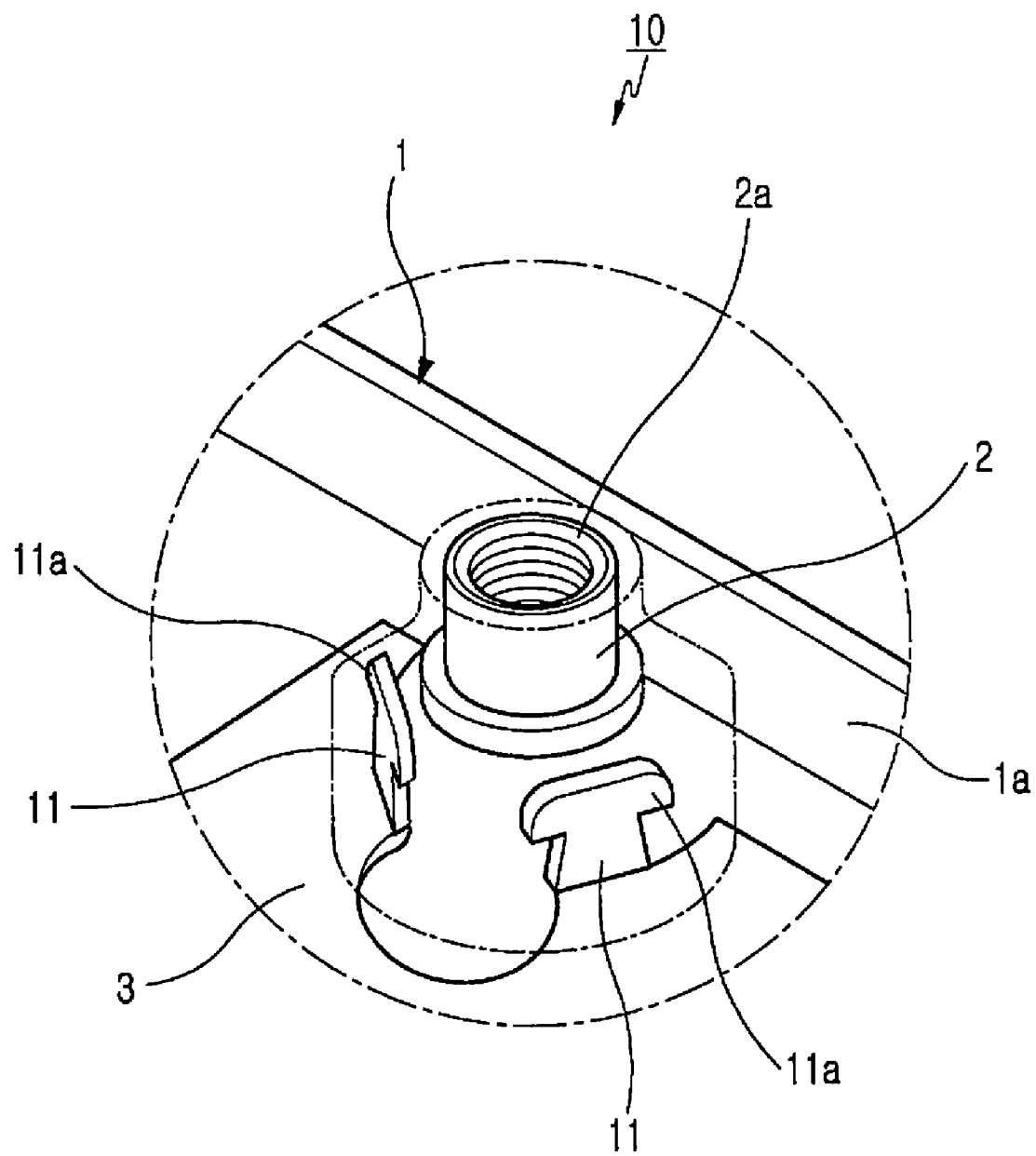
FIG. 4 is an enlarged illustration of part A of FIG. 3.
Figure 5:
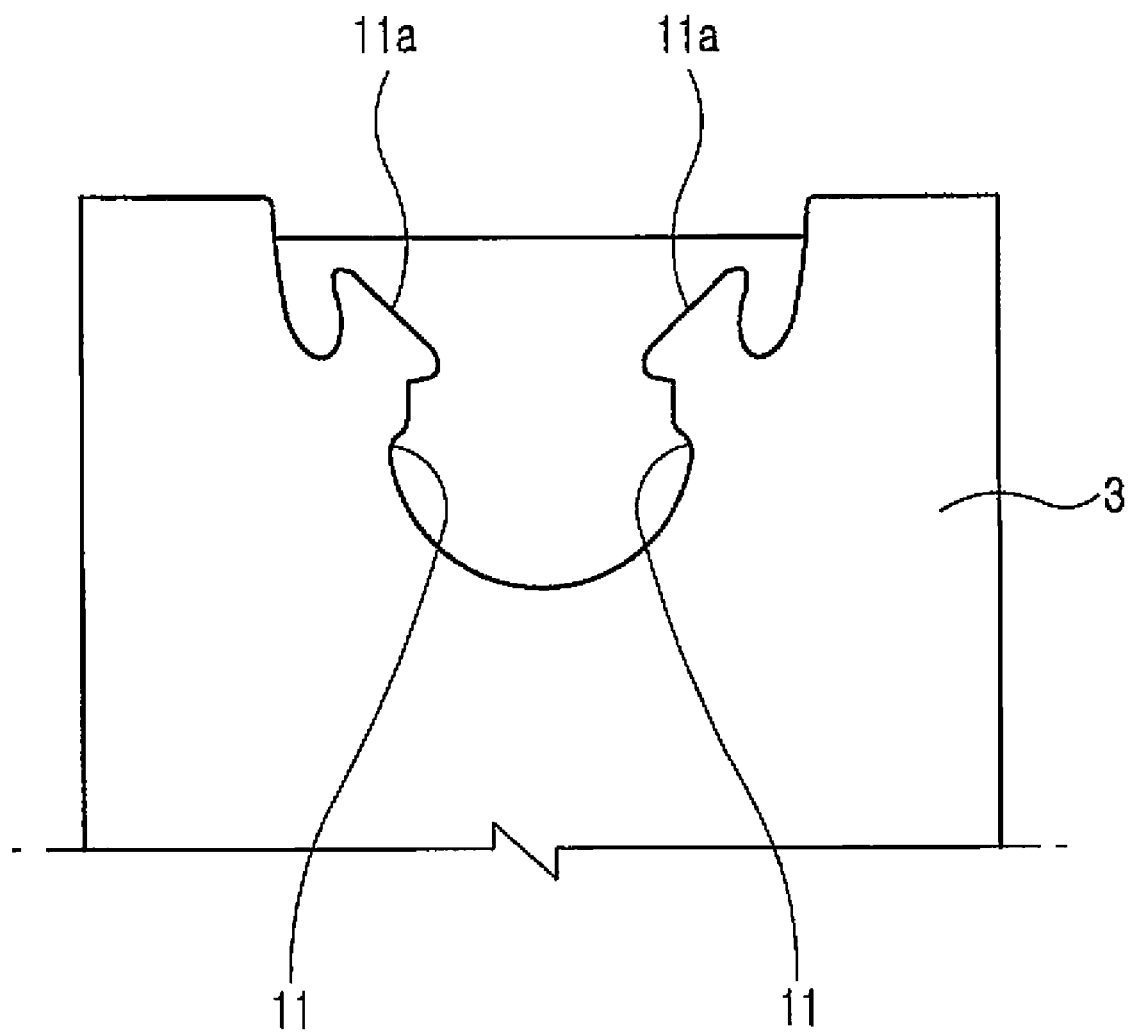
FIG. 5 illustrates a reinforcing part formed on a press member in the construction of a boss reinforcing apparatus of a portable communication device according to the present invention.

As shown in FIGS. 3 to 5, a boss reinforcing apparatus 10 of a portable communication device includes a press member 3, a case 1a of the portable communication device 1, a plurality of bosses 2, a screw assembling part 2a, and at least one reinforcing part 11. The press member 3 can be insert-injection-molded onto the case 1a, the case 1a can be insert-injection-molded onto the press member 3, and the boss 2 is formed when the case 1a is insert-injection-molded onto the press member 3. The screw assembling part 2a is formed in an inner side of the boss 2 during insert-injection-molding.

As shown in FIGS. 3 and 4, the reinforcing part 11 is assembled with the boss 22 that is formed in the case 1a when the case 1a is insert-injection-molded onto the press member 3 to reinforce the boss and prevent deformation of the boss resulting from external impact. The reinforcing part 11 is formed on a position of the boss 2 of the press member in order to prevent the screw assembling part 2a from separating from the boss due to deformation of the boss 2.

The reinforcing part 11 is formed in a "T" shape and in a circumference of the boss 2 formed on the press member 3.

The reinforcing part 11 is integrally formed with the press member 3 and includes a latching part 11a with which the boss is latched.

The operation of the boss reinforcing apparatus of the present invention will be described in more detail with reference to FIGS. 3 to 5.

As shown in FIGS. 3 and 5, the boss reinforcing apparatus 10 of the portable communication device includes at least one reinforcing part 11.

As shown in FIG. 5, the reinforcing part 11 is formed on the press member 3. As such, the reinforcing part 11 is bent along the circumference of the boss 2 formed on the press member 3.

The reinforcing part 11 is integrally formed with the press member 3. In this state, as shown in FIGS. 3 and 4, the boss 2 is formed when the case 1a of the portable communication device is insert-injection-molded onto the press member 3.

At this time, the reinforcing part 11 is latched with the boss 2 to be fastened when insert-injection-molding the boss 2. The reinforcing part 11 includes the latching part 11a so that the reinforcing part 11a is latched with the boss. The reinforcing part 11 is formed in a "T" shape for easy latching.

In this state, the reinforcing part 11 prevents the boss from deforming when the case 1a of the portable communication device 1 is dropped or externally impacted and prevents the screw assembling part 2a of the boss from separating as a result of any deformation of the boss 2.

While the boss reinforcing apparatus of the portable communication device of the present invention has been shown and described with reference to the preferred embodiments and drawings thereof, it will be understood by those skilled in the art that various changes in form and details may be made therein without departing from the spirit and scope of the invention as defined by the appended claims.

What is claimed is:

1. A boss reinforcing apparatus of a portable communication device including a press member, the apparatus comprising:

at least one reinforcing part assembled with a boss that is formed on a case of the portable communication device when the case is insert-injection-molded onto the press member, to reinforce the boss and prevent a screw assembling part formed on the boss from separating from the boss, wherein the reinforcing part is integrally formed with the press member and includes a latching part that is latched with the boss.

2. The boss reinforcing apparatus as claimed in claim 1, wherein the reinforcing part is formed in a T-shape.

3. The boss reinforcing apparatus as claimed in claim 1, wherein the reinforcing part is formed along a circumference of the boss that is formed on the press member.

* * * * *